United States Patent [19]
Gellekink

[11] Patent Number: 5,832,855
[45] Date of Patent: Nov. 10, 1998

[54] SHIP'S HULL

[75] Inventor: Bernard Gellekink, Ootmarsum, Netherlands

[73] Assignee: Hollandse Signaalapparaten B.V., Hengelo, Netherlands

[21] Appl. No.: 619,611

[22] PCT Filed: Sep. 22, 1994

[86] PCT No.: PCT/EP94/03170

§ 371 Date: Mar. 29, 1996

§ 102(e) Date: Mar. 29, 1996

[87] PCT Pub. No.: WO95/09102

PCT Pub. Date: Apr. 6, 1995

[30] Foreign Application Priority Data

Sep. 29, 1993 [NL] Netherlands ............................ 9301676

[51] Int. Cl.$^6$ ........................................................ B63B 1/04
[52] U.S. Cl. .............................................. 114/56; 114/140
[58] Field of Search ................................ 114/56, 140, 57

[56] References Cited

U.S. PATENT DOCUMENTS

| | | | |
|---|---|---|---|
| 2,167,689 | 8/1939 | Scowley | 114/56 |
| 2,361,409 | 10/1944 | Munro | 114/56 |
| 3,138,130 | 6/1964 | Morgan | 114/57 |
| 4,089,286 | 5/1978 | Scheel | 114/140 |
| 4,843,989 | 7/1989 | Langenberg | 114/57 |

FOREIGN PATENT DOCUMENTS

| | | |
|---|---|---|
| 4125187 A1 | 2/1993 | Germany . |
| 611430 | 10/1948 | United Kingdom . |
| 2197266 | 5/1988 | United Kingdom . |

*Primary Examiner*—Sherman Basinger
*Attorney, Agent, or Firm*—Oblon, Spivak, McClelland, Maier & Neustadt, P.C.

[57] ABSTRACT

A ship's hull including a first hull part arranged as a hard-chine-hull disposed on a second hull part in the shape of a super-slender float. During in service conditions, only the aft half of the first hull part intersects the water surface so that two separate bow waves develop. By appropriate selection of hull widths and by disposition of the first hull part on the second hull part, the bow waves are in phase opposition. This reduces the wave-induced drag of the ship's hull considerably, especially near the critical speed.

12 Claims, 6 Drawing Sheets

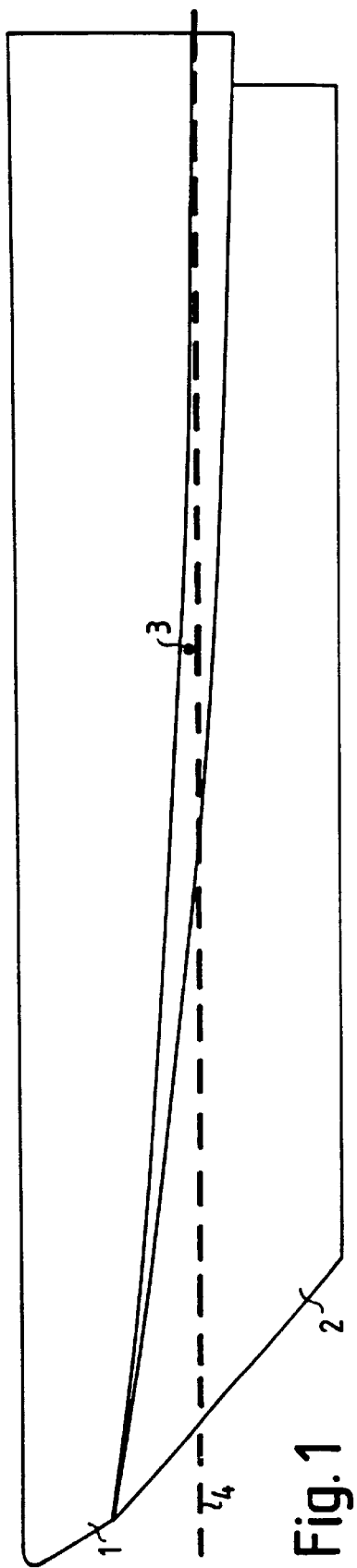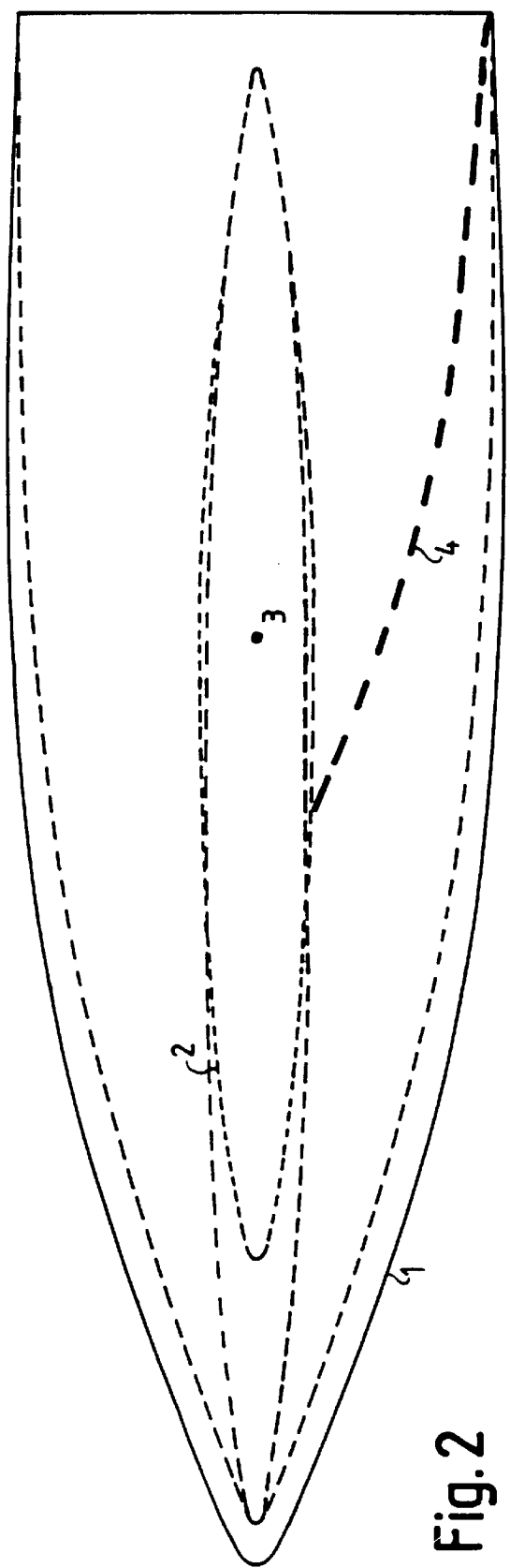

SHIP'S HULL

BACKGROUND OF THE INVENTION

1. Field of the Invention

The present invention relates to a ship'hull comprising a first hull part and, disposed under the first hull part, a second hull part which extends over at least substantially the full length of the first hull part and which is designed as an extremely slender float.

2. Discussion of the Background

A ship'hull of this type is known from DE-41 25 187 A1. The ship'hull described therein has many curved surfaces and is necessarily built in epoxy or the like with the aid of an expensive molds.

SUMMARY OF THE INVENTION

The ship'hull according to the invention on the contrary is easy to produce at substantially every shipbuilding yard and an expensive molds is not required. It is characterized in that both the first hull part and the second hull part are designed as at least substantially hard chine hulls having joint chine frame components.

A preferred embodiment of the invention is characterized in that the first hull part is disposed on the second hull part in such a way that in service conditions the fore half of the first hull part is above water level and the aft half of the first hull part is at least partly below the water level. The advantage is that a bow wave inevitably produced by the first hull part arises under the ship's hull and brings about an upward pressure near the center of the ship's hull.

A further preferred embodiment of the invention is characterized in that the second hull part provides from 70% to 90% of the buoyancy in service conditions. For these values the hull does not give rise to resonance phenomena, keeping the wave-induced drag low, while the second hull part still gives the hull a sufficient transverse stability.

From tests with a model on a scale of 1 to 10 it follows that resonance phenomena giving rise to the wave-induced drag do not occur, even at speeds higher, and even significantly higher, than the ship-bound critical hull speed. It is true that in a measuring range from zero to four times the ship-bound critical hull speed, the wave-induced drag increases, but the slope discontinuity in the graph of the wave-induced drag as a function of speed is absent. Therefore, sailing at speeds far beyond the ship-bound critical hull speed is practicable without an excessive increase in fuel consumption.

To be able to achieve that at a different load, too, the first bow wave from the first hull part and the second bow wave from the second hull part neutralize each other at least substantially, the second hull part can be provided with at least one ballast tank.

As to the ship's hull according to the invention it can be stated that it is a synthesis of the so-called super-slender water displacer having a width-to-length ratio of e.g. 6.5% and the classic ship's hull, for instance, the hard-chine hull having a width-to-length ratio of e.g. 30%.

A further favorable embodiment of the ship's hull according to the invention is characterized in that the width-to-length ratio of the first hull part amounts to 27%–38% and that of the second hull part amounts to 6%–9%.

In another preferred embodiment of the invention, the second hull part is designed so as to widen in the downward direction. This makes it easier to arrange the engine, fuel tank, fresh-water tank and ballast tanks and enables the hull to be put aground in a stable condition on a shoal, while the wave-induced drag is not significantly increased.

BRIEF DESCRIPTION OF THE DRAWINGS

The invention will now be further explained with reference to the accompanying drawings, in which:

FIG. 1 is a side view of the ship's hull in service condition;

FIG. 2 is a plan view of the ship's hull in service condition;

DISCUSSION OF THE PREFERRED EMBODIMENTS

Figure 3:
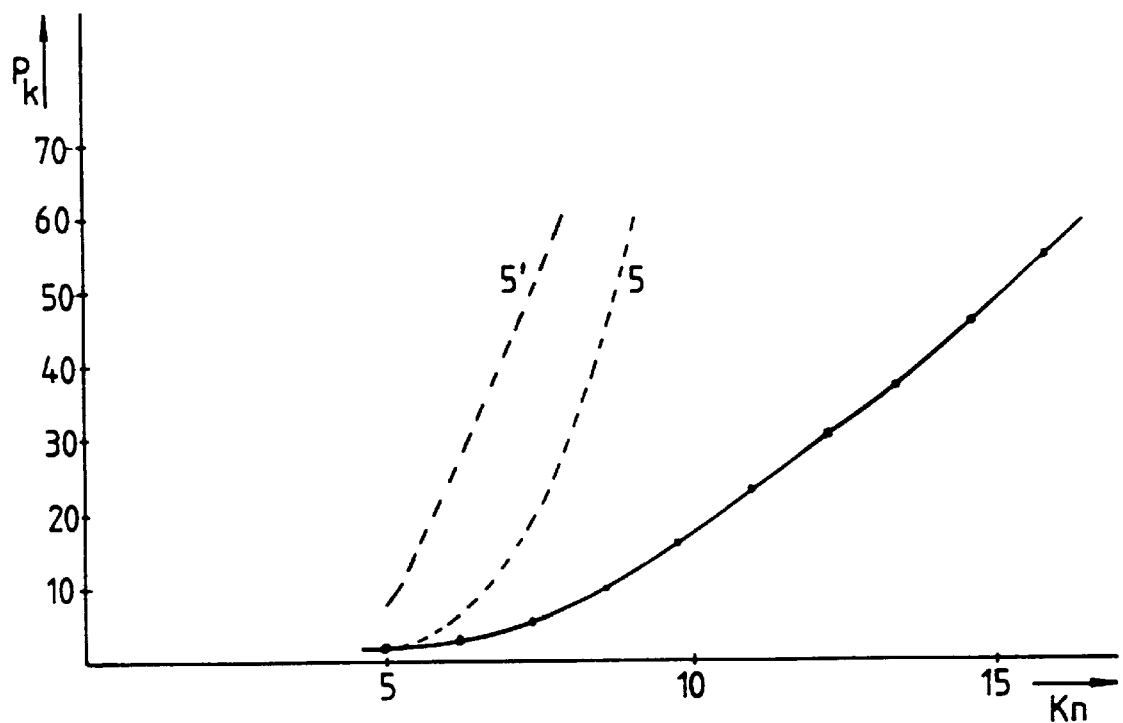
FIG. 3 is a graph of the engine power required for a 10 m long ship's hull according to the invention.

Every ship is marked by a certain speed beyond which a drastic increase in fuel consumption occurs. This speed, called the ship-bound critical hull speed is proportional to the square root of the ship's length. This phenomenon is associated with the occurrence of a sailing ship's bow wave and stern wave which amplify each other by interaction as soon as the critical hull speed is reached. There are two known methods of evading this phenomenon. The first method is adopted in e.g. a catamaran. Here, it involves a so-called super-slender water displacer having a width-to-length ratio of e.g. 6.5%. Such a water displacer is known to develop virtually no bow wave and stern wave and to be free from the resonance effect which gives rise to a high wave-induced drag. The second method involves a vessel which planes and, accordingly, does not produce a bow wave.

Either method has its specific drawbacks. A super-slender water displacer is less suitable for applications where the ship must have a cabin, e.g. a pleasure-boat or a patrol craft. A planing vessel, however, calls for a very large engine power, which entails a correspondingly high power consumption and a short radius of action as well as highly limited comfort to the persons on board, especially when one has to fall back on the water displacement mode because of the sea state.

The ship according to the invention whose hull in service condition is shown in the side view of FIG. 1 is intended to solve the problem in an inventive manner by the disposition of a first hull part 1, actually a classic ship's hull, on a second hull part 2, actually a super-slender water displacer. For the transverse stability it is then necessary that the first hull part is at least partly under water. This inevitably entails that a bow wave arises there where the first hull part 1 intersects the water surface. In accordance with the invention, this point is chosen to be approximately halfway the length of the ship's hull, in FIG. 1 near the ship's center of gravity. The fore end of the first hull part 1 is above the water level and the aft end is under the water level. The line of intersection 4 of the first hull part and the water surface is is also shown.

FIG. 2 shows a plan view of the ship's hull according to the invention comprising the first hull part 1, the second hull part 2, center of gravity 3 and the line of intersection 4 of the first hull part 1 and the water surface.

Tests with a model on a scale of 1 to 10 show, as expected, that the first hull part 1 as well as the second hull part 2 produces a bow wave. If the width-to-length ratio is now chosen to be 27%–38% for the first hull part, and 6%–9% for the second hull part, while making the bow wave of the first hull part arise halfway the ship's hull, then it appears that during sailing at the critical hull speed the two bow waves are in phase opposition, and that even at higher speeds a sudden increase in the wave-induced drag is not observed. A heuristic explanation of this advantageous effect is that, on one hand, the aforementioned resonance does not occur and, on the other hand, the ship does not need to sail against its own bow wave, but that the bow wave developed halfway actually produces a lifting force acting near the center of gravity.

With the scale model, the resistance of the ship's hull as a function of speed has been measured. The resistance thus measured is the total resistance, the sum of the wave-induced drag and the viscous frictional resistance. Subsequently, the viscous friction has been calculated with reference to the wet surface area of the scale model and the ITTC formula generally known in the art, making use of the Reynolds number calculated for the scale model. The wave-induced drag thus obtained can then be scaled up to a ship's hull of 10 m in length by the method generally known in the art. Following this, the total resistance of a 10 m ship's hull has been calculated by adding the viscous friction of the 10 m ship's hull calculated with the Reynolds number now applicable. The total resistance thus calculated is plotted as a graph shown in FIG. 3, together with graph 5 concerning a comparable, modern water displacer, and graph 5' concerning a planing deep-V hull known to those skilled in the art. It should be noted that in the ultimate, at a speed of 24 kn, the curve of the deep-V hull and that of the ship's hull according to the invention intersect. So, the present invention is particularly of importance for the range of speeds from one to three times the critical hull speed.

Figure 4:
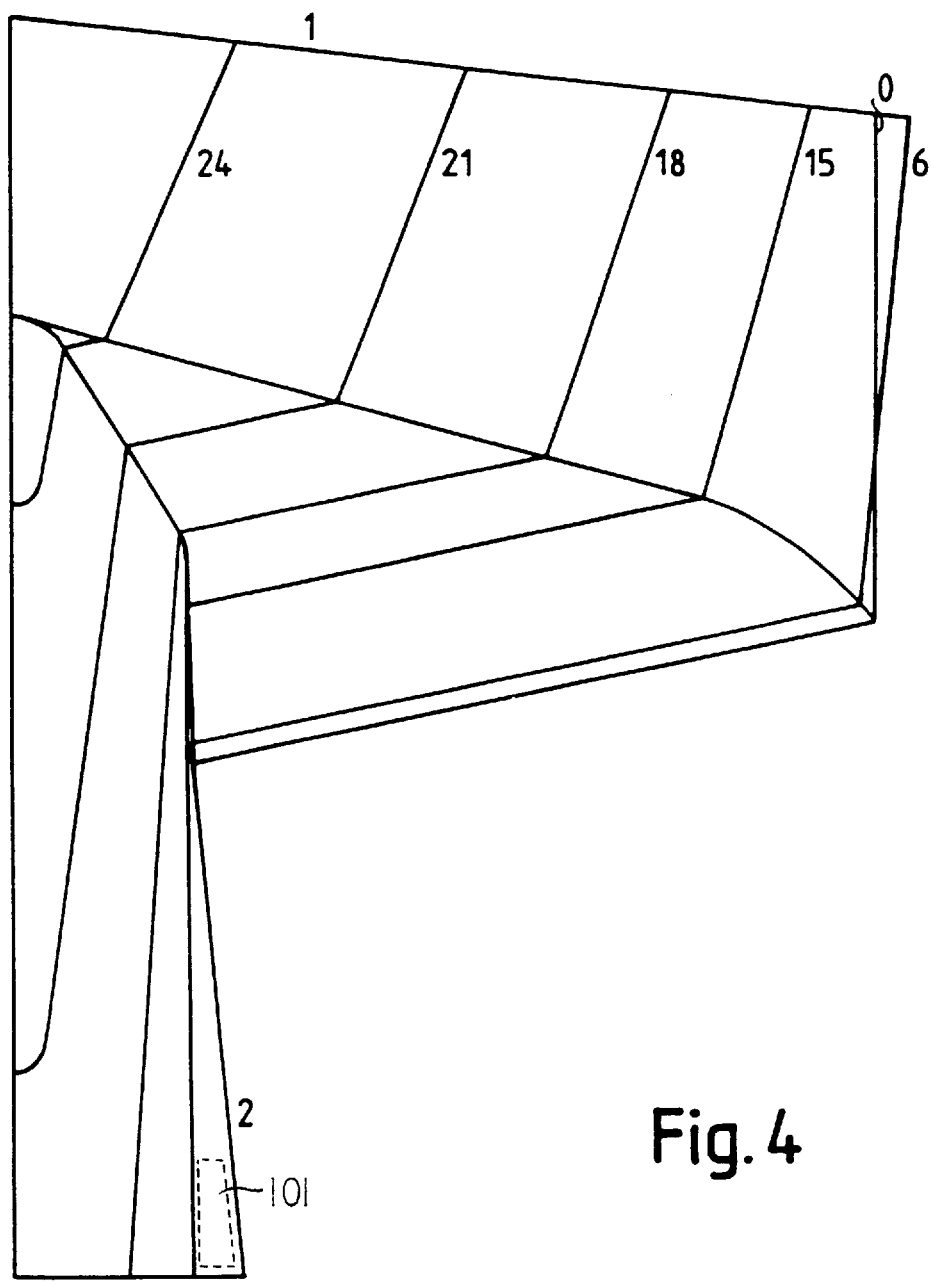
FIG. 4 is a simplified body plan of the ship's hull.

A simplified body plan of an embodiment of the ship's hull is shown in FIG. 4, where the first hull part 1 as well as the second hull part 2 is designed according to the classic hard-chine hull technology. The frame spacing is 40 cm and the frames depicted are nos. 0, 6, 15, 18, 21 and 24. The second hull part 2 may widen in the downward direction. This makes it easier to arrange the engine, fuel tank, fresh-water tank and ballast tanks 101 (as shown by the dashed lines) in the second hull part 2 and enables the hull to be put aground in a stable condition on a shoal. As regards the wave-induced drag, the increasing width does not present a drawback, because in this connection the width-to-length ratio at water level only is of importance. Furthermore, it should be noted that each frame comprises two united chine frame components. This makes a ship's hull according to the invention easy to produce at almost every shipbuilding yard. Also the costs of investment are low, because expensive molds are not required such as is the case in the production of polyester ship's hulls.

Figure 7:
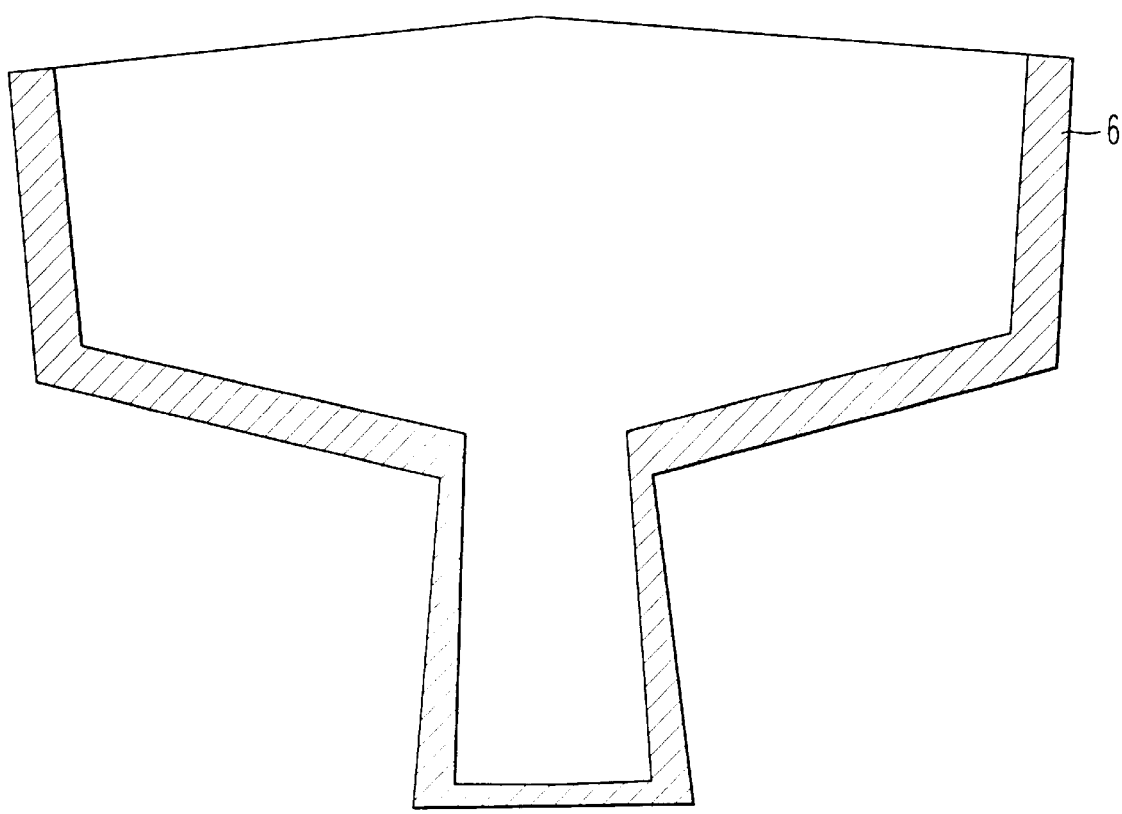
FIG. 7 illustrates an example of a frame as shown in FIG. 4.

In the shipbuilding art with respect to frames as illustrated in FIG. 4, the frames are routinely built by cutting an entire shape of the frame from a plate. This is illustrated in FIG. 7 which shows the frame 6 from FIG. 4. The shape as shown in FIG. 7 is cut and the frames as defined in FIG. 4 are produced accordingly. Then the frames are located at 40 cm from each other, and the actual hull plates are welded to the frames.

From FIG. 4 it also appears that the first hull part 1 diverges outwardly to the aft, where the stern is to give the ship's hull the necessary transverse stability. At small roll angles, the transverse stability actually stems from the stern only, because the fore body is above the water level and therefore unable to produce a self-righting moment, and because in that case the self-righting moment of the second hull part does not play a part.

Figure 5:
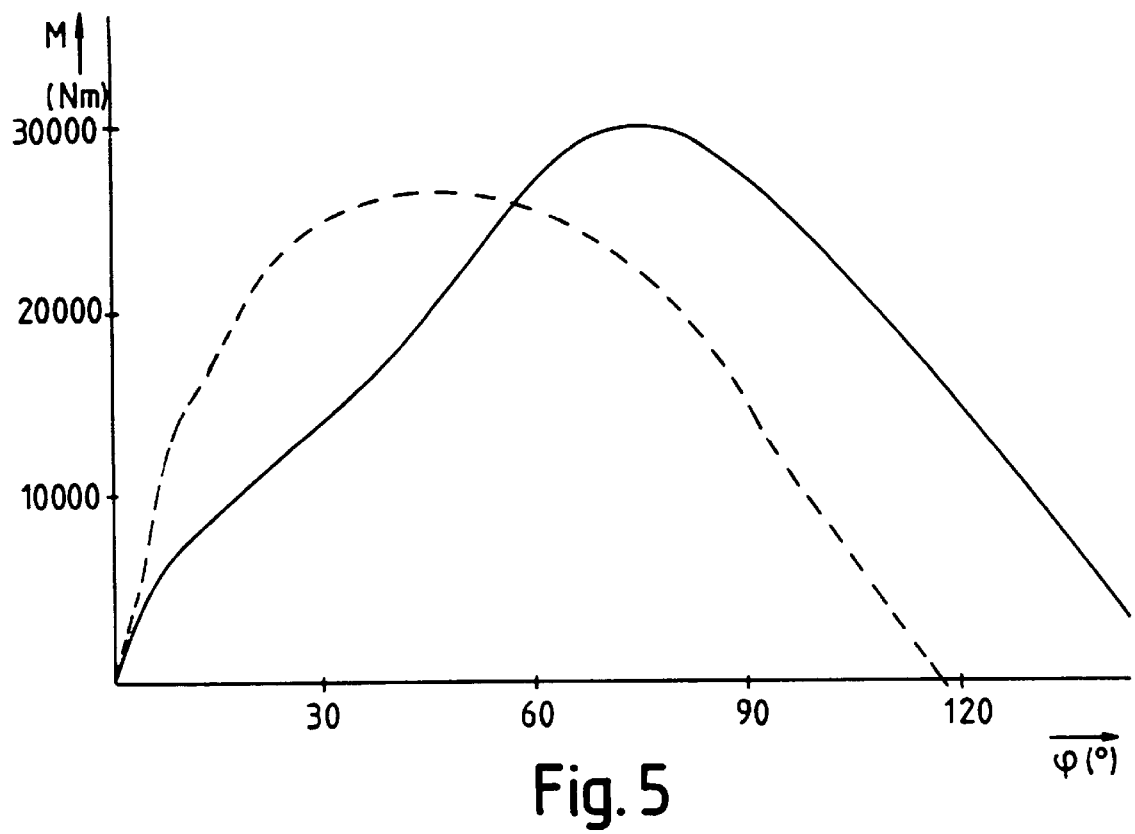
FIG. 5 is a graph of the self-righting moment of the ship's hull according to the invention.

The self-righting moment M of the ship's hull according to the invention as a function of the roll angle $\phi$ is depicted in FIG. 5. Here, the first hull part 1 produces the self-righting moment at small angles, and the second hull part 2 produces a large self-righting moment at large roll angles, when this relatively heavy part comes into a horizontal position. In addition, the self-righting moment for a comparable hard-chine hull is shown as a dashed curve. From FIG. 5 it appears also that the suitably chosen shape results in a self-righting moment increasing monotonously as the roll angle increases, up to a roll angle of about 75° as shown in FIG. 5, providing a flexible, stable and non-laborsome behavior as compared with the hard-chine hull. Further, it appears that the surface integral of the graph associated with the ship's hull according to the invention is larger than that of the graph concerning the hard-chine hull. This indicates that the range of stability known to those skilled in the art is excellent.

Figure 6:
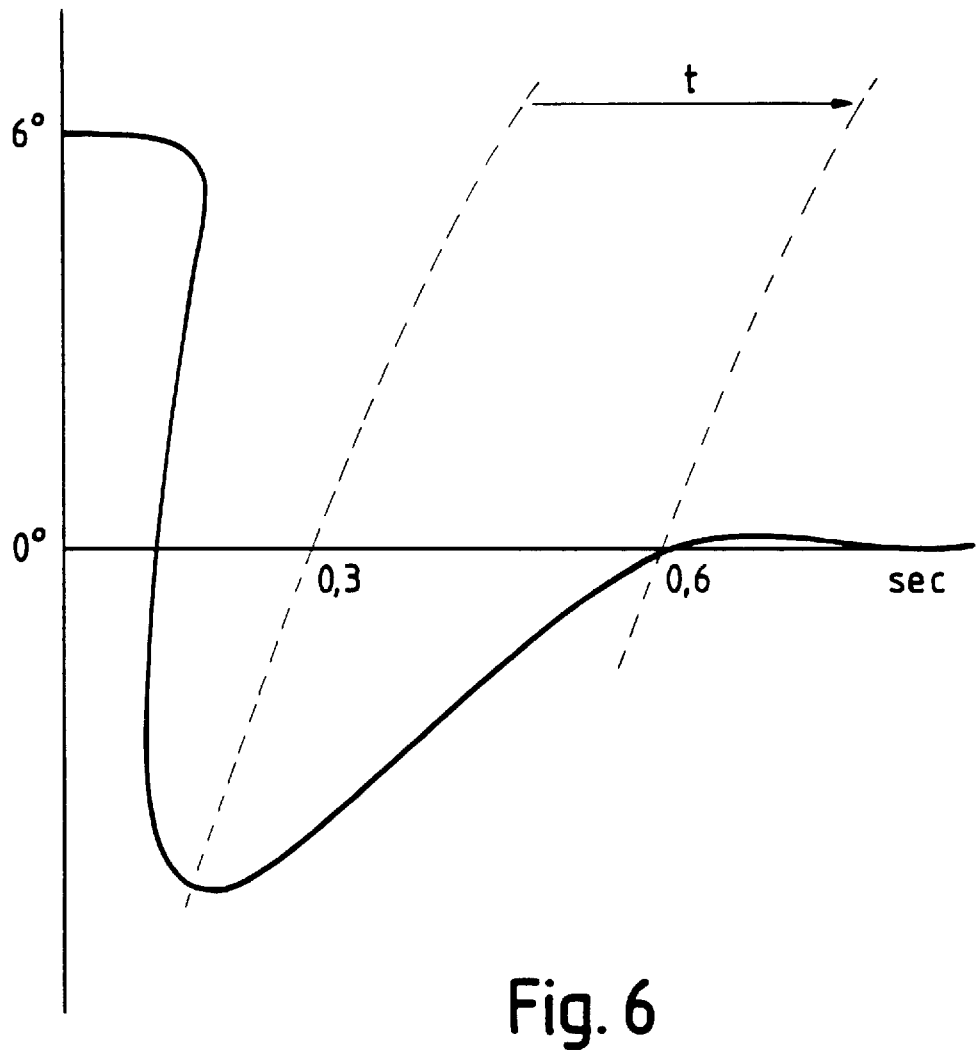
FIG. 6 is a graph of the step response for rotation about the longitudinal axis of the ship's hull according to the invention.

The comfort on board is largely determined by the step response for rotation about the longitudinal axis of a ship. FIG. 6 shows the step response of a ship's hull according to the invention at a roll angle of 6 degrees. The step response is excellent owing to the large resistance to roll motion of the second hull part 2. Besides this, the second hull part 2 provides a very good directional stability, which is sufficient to compensate the first hull part's broaching tendency, if present.

A further advantage of the ship's hull is that the propulsive efficiency is relatively high because the load coefficient known to those skilled in the art is low, owing to the relatively low power desired, and because the arrangement allows for a large-diameter propeller. In addition, the arrangement according to the invention ensures a favorable flow of water onto the propeller. Since the power curve for the ship's hull, known to those skilled in the art, in the arrangement according to the invention has virtually the same pattern as the "prop law" curve for the propeller, a propeller efficiency of between 70% and 75% is feasible. Apart from a high efficiency, a propeller used in this way will increase the comfort to the people on board owing to the low level of noise produced.

I claim:

1. A ship's hull comprising a first hull part and a second hull part disposed under the first hull part, the second hull part extending over at least substantially the full length of the first hull part and being in the form of an extremely slender float, wherein the first hull part and the second hull part are designed as at least substantially hard chine hulls having joint chine frame components, and when on water the first hull part intersects a water level at a point approximately halfway along a length of the ship's hull.

2. A ship's hull according to claim 1, wherein the first hull part is disposed on the second hull part in such a way that on water the fore half of the first hull part is above the water level and the aft half of the first hull part is at least partly below the water level.

3. A ship's hull according to claim 2, wherein the first hull part is disposed on the second hull part in such a way that a first bow wave of the first hull part and a second bow wave of the second hull part are in phase opposition at substantially a ship-bound critical hull speed.

4. A ship's hull according to claim 2, wherein at least substantially the fore half of the first hull part is above the water level.

5. A ship's hull according to claim 4, wherein the second hull part is provided with at least one ballast tank.

6. A ship's hull according to claim 4, wherein a self-righting moment of the ship's hull increases at least substantially monotonously as a roll angle of the ship's hull increases.

7. A ship's hull according to claim 6, wherein the aft half of the first hull part is designed for obtaining a sufficient transverse stability at small roll angles.

8. A ship's hull according to claim 4, further comprising means for obtaining a self-righting moment which increases monotonously as the roll angle increases up to a roll angle of 75°.

9. A ship's hull according to claim 2, wherein the second hull part provides from 70% to 90% of buoyancy on water.

10. A ship's hull according to claim 1, wherein a width-to-length ratio of the first hull part is approximately 27%–38%, and a width-to-length ratio of the second hull part is approximately 6%–9%.

11. A ship's hull according to claim 10, wherein the second hull part widens in a downward direction.

12. A ship's hull according to claim 1, wherein the second hull part provides from 70% to 90% of buoyancy on water.

* * * * *